Patented June 27, 1944

2,352,164

UNITED STATES PATENT OFFICE 2,352,164

METAL DEACTIVATOR

Hugh D. Burnham, Edwardsville, Ill., and Frederick T. Weiss, Normandy, Mo., assignors to Shell Development Company, San Francisco, Calif., a corporation of Delaware No Drawing. Application September 7, 1942, Serial No. 457,636

9 Claims. (Cl. 252—51)

This invention relates to the stabilization of organic substances and particularly to the protection of organic substances against deterioration through oxidation catalyzed by the presence of certain metals and their catalytically active compounds. More particularly, it deals with improved industrial mineral hydrocarbons which, during their useful life, come in contact with or contain either in dissolved or dispersed form, metals capable of catalyzing oxidation.

It is well known that organic substances normally contact metals and frequently contain small amounts of metals dissolved in the form of a soluble salt such as a soap. It has been observed that the presence of such metals may have a detrimental effect on the stability of the organic substances. Inasmuch as bare traces of the metal may be very harmful and since the removal of these last traces is extremely difficult, it is often impossible to eliminate this troublesome catalyst of the polymerization and oxidation reactions.

It has already been suggested to reduce the susceptibility of the organic substances to oxidation, induced by the presence of copper and other catalytically active metals, by adding to the organic substances certain deactivators which have the property of rendering the catalytic metals inactive. Among the deactivators heretofore suggested have been condensation products of aliphatic and aromatic primary polyamines with salicylaldehyde, benzoyl acetone, acetyl acetone, etc., to form aldoximes and ketoximes such as o-hydroxy naphthylaldoxime, salicylaldoxime, etc., and similar compounds. It is known, for example, that the addition of these deactivators reduces gum formation and rate of oxygen absorption in the presence of copper.

It is a purpose of this invention to improve the effectiveness of organic metal deactivators known to be effective in reducing the catalysis of metal oxidation promoters, such as copper and its compounds by introducing additionally a salt of a non-catalytic metal with a very weak acid or a compound exhibiting weakly acidic properties. It is another purpose to provide a combination of compounds, one of which is a deactivator, which combination when added to organic substances remains active for a considerable length of time when subjected to oxidizing influences. An important application of the combination is as stabilizers for lubricating oils to retard discoloration, sludge and acid formation, etc., due to catalytic oxidation during use when in contact with catalytic metals, particularly copper-containing bearings, and other engine parts.

We have discovered that organic metal deactivators such as nitrogen-bearing compounds, which have a configuration such that the metal to be deactivated becomes a member of a five or six membered chelate ring, co-operate with non-catalytic metal salts of very weak acids or compounds exhibiting weakly acidic properties to render organic substances containing metal oxidation catalysts stable against oxidation catalyzed by metallic copper. The deactivating power of this combination is considerably greater than that of the organic deactivator alone—a fact which is surprising since usually the salts of the weak acids or compounds exhibiting weakly acid properties have no deactivating properties when used alone.

Suitable organic nitrogen-bearing compounds having a configuration such that the proper chelate ring is formed with the metal are those in which there is a polar radical capable of forming electrovalent metal compounds such as an acid reacting group or an amine group capable of forming metal amides, separated from an aliphatic double-bonded trivalent nitrogen atom by at least two carbon atoms such that the total number of atoms in series from the nitrogen atom to the metal, inclusive, is 5 or 6. The acidic group may be —OH (in vicinal position to a double bond as in —COOH), —SH, —COSH, etc. Examples of such configurations are:

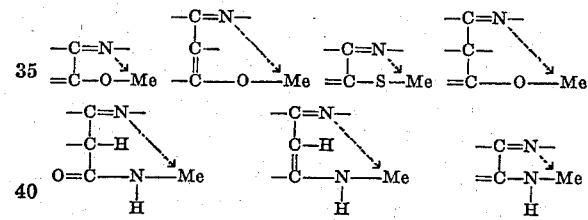

The effective configurations are characterized by the property of resonance. Resonance is considered to be the ability that certain molecules have of existing in an electronic state intermediate between two or more valence-bond structures that it is possible to write for the compound. The question of resonance is discussed in detail in Pauling "Nature of the Chemical Bond."

Various classes of deactivators that may have the proper configuration are exemplified by the following: amino acetic acids, diphenylglyoxime, nitroso phenyl hydroxylamine, benzoinoxime, 2-hydroxy acetophenoxime, cyclohexanolonoxime, salicylaldoxime, 2-hydroxy-1-naphthylidine-n-butylamine, 2-hydroxy-1-naphthylidene-n-ethanolamine, 2-hydroxy-1-naphthylidene diethylene triamine, hydro-(2-hydroxy-1-naphthylamide), salicylal ethanolamine, salicylal ethylamine, disalicylal ethylene diamine, benzoyl acetonyl ethylene diamine, acetyl acetonyl ethylene diamine.

Solubility in hydrocarbon oils such as gasoline or lubricating oils of the above illustrated types or reaction products of primary diamines with salicyaldehyde or other hydroxy aromatic aldehydes is usually sufficient for dissolution of effective amounts. However, metal complexes of these compounds are relatively insoluble in hydrocarbon oils. Accordingly to make certain that no oil-insoluble metal complexes are formed in situ and precipitate in, for example, a lubricating oil, it may be necessary to attach oil-solubilizing radicals to said reaction products or to components going into the making of said products.

Effective oil-solubilizing radicals are, in general, aliphatic and cyclo-aliphatic hydrocarbon radicals possessing three or more carbon atoms, such as isopropyl, primary, secondary and tertiary butyl, etc., radicals; more than one solubilizing radical may be attached to the compound. More effective solubilizing radicals possess 6 or preferably 10 or more carbon atoms, such as hexyl, heptyl, octyl, iso-octyl, decyl, dodecyl, tetradecyl, cetyl, wax, etc., radicals; cyclo-aliphatic radicals such as cyclohexyl, methyl cyclohexyl, bi-cyclohexyl, $C_{12}$–$C_{24}$ cycloaliphatic radicals, produced by hydrogenating corresponding condensation products of acetone, mesityl oxide, etc.

While solubility-in-oil requirements favor large solubilizing radicals, it is, on the other hand, desirable to keep these radicals to the minimum consistent with solubility to minimize the tendency of the radicals to reduce the deactivator effectiveness caused by steric hindrances. Further, it is desirable that the alkyl radical should contain not more than 12 carbon atoms in order to produce relatively low molecular weight compounds because the reaction between deactivator and the catalytic metal is apparently one in which one mol of a nitrogen bearing component such as alkylated salicylal ethylene diamine is capable of reacting with not more than one atom of the metal. It is not, therefore, desirable to add too great an amount of dead load to the molecule of the deactivator.

The deactivators may be produced by any one of several well-known reactions. For example, an amine-aldehyde type deactivator may be prepared by the condensation of one mol of a primary diamine with two mols of hydroxy aromatic aldehydes under conditions such that one mol of aldehyde reacts with each primary amine group of the amine to produce an arylidene amine having an acidic hydroxy group attached to the aromatic nucleus. An alkylated deactivator, for example, tetra-isopropyl disalicylal ethylene diamine, may be prepared as follows:

1.1 mols of an alkylated hydroxy aromatic acid, e. g. diisopropylsalicyclic acid, is dissolved with .56 mol of sodium carbonate in 2 liters of water and warmed until a clear solution is obtained. Then 0.6 mol of ethylene diamine is added followed by 5 mols of boric acid. Sodium amalgam is added to the mechanically stirred solution, care being taken to keep the solution faintly acidic by occasional additions of boric acid. After stirring for at least an hour the precipitate is filtered off and washed with water and dissolved in ether. The yellow ether solution is mixed with 0.25 mol of $H_2SO_4$ per mol of reacting alkylated aromatic acid and steam distilled. The distillate is made slightly alkaline with sodium carbonate and extracted with ether. The ether solution is evaporated and the resulting hydroxy aldehyde is a light brown oil. This aldehyde and ethylene diamine are then dissolved separately in boiling ethanol and the hot solution of ethylene diamine is added slowly to the boiling aldehyde solution. The reaction product appears slowly as a yellow color in the solution and upon cooling separates as a yellow crystalline product. The yellow product is purified by recrystallization from a benzene solution.

Suitable weak acids or compounds exhibiting weakly acidic properties capable of forming the useful salt additives of our combination are those having a dissociation constant measured in water solutions below about $10^{-7}$, i. e., between about $10^{-8}$ and $10^{-12}$. Such acids should have configurations such that they form electrovalent bonds though not necessarily to the exclusion of covalent bonds with the non-catalytic metal, so that corrosive organic carboxylic acids, (e. g., fatty acids, naphthenic acids, etc., which are often contained in the organic substances to be protected or are formed thereby by oxidation or otherwise) can displace the non-catalytic metal from the salt, thereby being neutralized. The weak acid which is simultaneously liberated is too weak to be corrosive. Apparently the mechanism by which the salt additive enhances the effectiveness of the deactivator is one of buffering, thereby reducing the initial rate of corrosion of this substance toward the catalytic metal. Neutralization of the corrosive organic carboxylic acids causes formation of a detergent, which detergent is capable of removing protective films on the catalytic metal. As a result, the catalytic metal is exposed both to corrosive attack and to enhanced protection by the deactivator. Inasmuch as corrosive acids have been removed by the neutralization, the deactivator can now assert its full protective powers.

Suitable weak acids or compounds exhibiting weakly acidic properties are, for example, mercaptans, alkylated phenol polysulfides, or compounds having a hydroxyl group in alpha position to a double bond such as beta diketones, e. g. acetyl acetone, alkyl benzoyl acetone, phenyl acetyl acetone, etc., also alkyl phenols such as di-amyl phenol, cetyl phenol, cyclohexyl phenol, wax-substituted phenols, alkylated cresylic acids, alkylated diphenol, triphenol methanes, corresponding thiophenols, nitrophenols, etc.; polyphenols, e. g. diphenols such as alkyl diphenol sulfides or polysulfides, corresponding selenides, tellurides, or diphenol methanes containing various alkyl radicals, carboxyl phenols such as salicylic acid, alkyl salicylic acid, e. g., methyl, ethyl, propyl, isopropyl, di-isopropyl, wax substituted salicylic acid, the carboxyl radical of which is esterified with an alcohol having 6 or more carbon atoms, e. g. a fatty alcohol such as lauryl, myristyl, cetyl, stearyl, oleyl, etc., alcohol, or with an alicyclic alcohol such as straight and branched chain alkyl cyclopentanols, e. g. mono-, di- and tri-methyl, ethyl, normal and isopropyl, primary, secondary or tertiary butyl, dimethyl amyl, etc., and combinations thereof; cyclopentanols, corresponding cyclohexanols; or polynuclear monohydroxy alcohols such as alkyl and branched alkyl cycloheptanols, e. g. di-n-propyl cycloheptanol, normal, secondary and tertiary butyl cycloheptanol, iso-amyl cycloheptanol, etc., corresponding alkyl and branched alkyl decalols, e. g. di-methyl decalol, tri-methyl decalol, etc.; bi-alicyclic alcohols having branched alkyl radicals produced by hydrogenating the condensation product of lower aliphatic ketones, e. g. acetone, methyl ethyl ketone, mesityl oxide, isophorone, etc.; polyhydro and alkyl substituted polyhydro-anthracene-ols; corresponding polyhydroxy alicyclic alcohols, e. g. ethyl deca-diols, etc.; certain nitrogen-bearing acids such as alkyl amino acetic acid, alkyl a-amino propionic acid, o-amino alkyl benzoic acid, isonitroso alkyl acetone, the alkyl radical being large enough to confer solubility of the salt in the organic substance.

Metals that form useful salts must be themselves substantially non catalytic and replaceable in the salt by oxidation catalyst metals. These metals are lithium, beryllium, magnesium, calcium, strontium, barium, zinc, cadmium, aluminum, and tin. Of these zinc and magnesium are preferred.

It is, of course, understood that the salts must be soluble in the substance to be protected. It is often necessary to attach oil-solubilizing radicals by methods similar to those discussed above for increasing the solubility of deactivator compounds.

The combination of additives of this invention are effective in various normally liquid and normally solid, liquefiable, substantially neutral, purely organic substances which are reasonably stable upon exposure to atmospheric oxygen under normal conditions of storage or use or both in the absence of active metal oxidation catalysts, but which oxidize in their presence; which substances are further free from metals except for small quantities of metal or metal compound contaminants such as may have been introduced during processing, manufacture, or normal use. Thus various refined and semi-refined hydrocarbon oils may be stabilized such as gasoline, kerosene, special boiling-point solvents, Diesel fuels, spray oils, lubricating oils, etc.; pure hydrocarbons, such as benzene, toluene, various liquid olefins, etc. Other substances capable of being protected are, for example, animal fats and oils, vegetable fats and oils, photographic developers, both natural and synthetic essential oils, perfumes, cellulose acetate, various resins, rubber, etc.

The amounts of each of the components of this invention, needed effectively to suppress the catalytic action of the metals or their compounds, will naturally vary with the stability requirements of the treated product as well as with the amount of catalytic metal contained in the organic substance.

In general, quantities of deactivators ranging from about .01% to 1% and quantities of non-catalytic metal salts or compounds exhibiting weakly acidic properties of weak acids ranging from about .05% to 2% are useful and provide the necessary protection although under certain circumstances amounts outside of these limits may be used. Preferred ranges of these compounds are .02% to .2% of deactivator and .1% to .5% of metal salt.

The following examples further illustrate our invention:

Example I

A sample of 120 S. U. V. at 210° F. aviation oil was divided into four portions. To each sample was added 2.2 cm.² copper surface per gram of oil in the form of copper wire. To one sample was added .4% by weight of tetra-isopropyl disalicylal ethylene diamine. To another sample was added .32% by weight of the magnesium salt of acetyl acetone. To a third sample were added .3% tetra-isopropyl disalicylal ethylene diamine and .32% magnesium salt of acetyl acetone. Each of the oils was then exposed to pure oxygen at atmospheric pressure and at a temperature of 150° C. Induction periods for the oils were as follows:

| Additive | Induction period |
| --- | --- |
|  | *Minutes* |
| None | 75 |
| .4% tetra-isopropyl disalicylal ethylene diamine | 450 |
| .32% magnesium salt of acetyl acetone | 35 |
| .13% tetra-isopropyl disalicylal ethylene diamine plus .32% magnesium salt of acetyl acetone | 565 |

Example II

A sample of 120 S. U. V. at 210° F. aviation oil was divided into four samples. To each sample was added 2.2 cm² copper surface per gram of oil in the form of copper wire. To one sample was added .1% disalicylal ethylene diamine. To another sample was added .9% magnesium salt of the salicylic acid ester of lauryl alcohol. To a third sample were added .1% disalicylal ethylene diamine and .9% magnesium salt of the salicylic acid ester of lauryl alcohol. Each of the oils was then exposed to pure oxygen at atmospheric pressure and at a temperature of 150° C. Induction periods for the oils were as follows:

| Additive | Induction period |
| --- | --- |
|  | *Minutes* |
| None | 80 |
| .1% di-salicylal ethylene diamine | 200 |
| .9% magnesium salt of the salicylic acid ester of lauryl alcohol | 35 |
| .1% di-salicylal ethylene diamine plus .9% magnesium salt of the salicylic acid ester of lauryl alcohol | 970 |

The combination of additives of this invention may be used in conjunction with other addition agents, for example, in gasolines together with anti-oxidants, or in lubricating oils together with anti-oxidants, blooming agents, anti-corrosives, E. P. compounds, etc. It is, however, desirable that the secondary addition agent shall not raise the acidity of the substance to be desensitized to the point of greatly diminishing the activity of the deactivators.

We claim as our invention:

1. A composition of matter consisting essentially of a substantially neutral purely organic substance which is normally stable but oxidizes when exposed to atmospheric oxygen in the presence of a copper oxidation catalyst, said substance having dissolved therein a small amount each of an organic nitrogen-bearing deactivator for copper catalysts, said deactivator having a configuration capable of forming a 5 or 6 membered nitrogen containing chelate ring with said metal and of a metal salt of a weak acidic compound, having a dissociation constant below about $10^{-7}$ and having a configuration such that a corrosive carboxylic acid can displace it from said salt, said metal in said salt being non-catalytic and selected from the group consisting of lithium, beryllium, magnesium, calcium, strontium, barium, zinc, cadmium, aluminum, and tin, said additives being soluble in said substance at least to the extent of .01% and present in sufficient amount to stabilize said composition.

2. The composition of claim 1, wherein the amount of deactivator is between .01% and 1% and the amount of metal salt is between .05% and 2%.

3. A hydrocarbon oil which is normally stable but oxidizes when exposed to atmospheric oxygen in the presence of copper catalyst, said substance having dissolved therein a small amount each of an organic nitrogen-bearing deactivator for copper catalysts, said deactivator having a configuration capable of forming a 5 or 6 membered nitrogen containing chelate ring with said metal and of a metal salt of a weak acidic compound having a dissociation constant below about $10^{-7}$ and having a configuration such that a corrosive carboxylic acid can displace it from said salt, said metal in said salt being non-catalytic and selected from the group consisting of lithium, beryllium, magnesium, calcium, strontium, barium, zinc, cadmium, aluminum, and tin, said additives being soluble in said substance at least to the extent of .01% and present in sufficient amount to stabilize said oil.

4. A refined lubricating oil which is normally stable but oxidizes when exposed to atmospheric oxygen in the presence of copper catalyst, said substance having dissolved therein a small amount each of an organic nitrogen-bearing deactivator for copper catalysts, said deactivator having a configuration capable of forming a 5 or 6 membered nitrogen containing chelate ring with said metal and of a metal salt of a weak acidic compound having a dissociation constant below about $10^{-7}$ and having a configuration such that a corrosive carboxylic acid can displace it from said salt, said metal in said salt being non-catalytic and selected from the group consisting of lithium, beryllium, magnesium, calcium, strontium, barium, zinc, cadmium, aluminum, and tin, said additives being soluble in said substances at least to the extent of .01% and present in sufficient amount to stabilize said oil.

5. A hydrocarbon oil containing dissolved a small amount each of a disalicylal ethylene diamine and a non-catalytic metal salt of a salicylic acid ester of an alcohol having at least 6 carbon atoms.

6. The hydrocarbon oil of claim 5, wherein the metal is magnesium.

7. A hydrocarbon oil containing dissolved a small amount each of a disalicylal ethylene diamine and a non-catalytic metal salt of a salicylic acid ester of a fatty alcohol having at least 6 carbon atoms.

8. A hydrocarbon oil containing dissolved a small amount each of a disalicylal ethylene diamine and a non-catalytic metal salt of a salicylic acid ester of an alicyclic alcohol having at least 6 carbon atoms.

9. A hoydrocarbon oil containing dissolved a small amount each of a disalicylal ethylene diamine and the zinc salt of acetyl acetone.

HUGH D. BURNHAM.
FREDERICK T. WEISS.